R. Black.
Making Metal Tools.
Nº 66,781.   Patented Jul. 16, 1867.
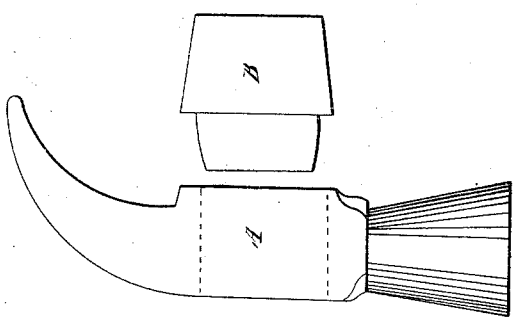
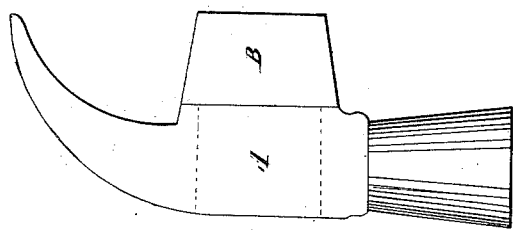
Witnesses;
Edward H. Hyde
J. M. Knowlton
J. B. Gardiner
Attorney for Black
Inventor;

United States Patent Office.

ROBERT BLACK, OF HOLYOKE, ASSIGNOR TO HIMSELF, MARTIN DEVINEY, AND JOHN MURPHY, OF CHICOPEE, MASSACHUSETTS.

Letters Patent No. 66,781, dated July 16, 1867; antedated July 7, 1867.

IMPROVED HAMMER-HEAD.

The Schedule referred to in these Letters Patent and making part of the same.

TO ALL WHOM IT MAY CONCERN:

Be it known that I, ROBERT BLACK, of Holyoke, Hampden county, Commonwealth of Massachusetts, have invented a new and useful improved Hammer-Head; and I do hereby declare that the following is a full and exact description thereof, reference being had to the accompanying drawings, and to letters of reference marked thereon. In the drawings—

Figure 1 represents a side view of my invention.

Figure 2 represents the parts separated.

This invention consists in a peculiar and advantageous method of manufacturing the heads of hammers, so as to cheapen their construction, without interfering with the efficacy or finish of the tool, it being of the ordinary shape outwardly, but formed in a different manner.

In construction I form my hammer-head of two parts, A and B, the one, A, having the face and claw upon it, and formed with the eye C through it, and the other part being an eye or case for the insertion of the handle. Usually these parts are formed in one piece, wrought from soft metal and then hardened and tempered. In this mode of construction great difficulty is found in forming the socket B upon the head, and a great deal of labor has to be expended upon this part. In order to obviate this expenditure of time I form the socket B of a malleable iron, the remainder of the head being formed in the usual manner by forging, except that the eye C is formed so as to receive the upper part $a$ of the socket B. This socket, B, is then attached to the head by brazing the former on to the latter.

By this means I obtain a hammer-head quite as neat in appearance and fully equal in point of durability to those made on the old plan, with an expenditure of not more than one-half of the time and labor formerly used in their manufacture.

Now, having described my invention, what I claim as new, and desire to secure by Letters Patent, is—

As a new article of manufacture, a hammer-head constructed of the parts A and B, the part B being cast and attached to the part A, substantially in the manner and for the purpose described.

ROBERT BLACK.

Witnesses:
EDWARD H. HYDE,
J. B. GARDINER.